United States Patent [19]
Miller

[11] 3,945,087
[45] Mar. 23, 1976

[54] DOOR CLAMP

[76] Inventor: Ray Andrew Miller, Plaza Real Apartments, Apartment No. 10, 161 Country Club Drive, South San Francisco, Calif. 94080

[22] Filed: Nov. 7, 1974

[21] Appl. No.: 521,668

[52] U.S. Cl............... 24/73 CS; 24/252 R; 254/131
[51] Int. Cl.².................... A44B 21/00; B66F 3/00
[58] Field of Search ............. 49/276, 277; 254/131; 24/73 CS, 81 AB, 248 SB, 254, 252 R, 81 AC

[56] References Cited
UNITED STATES PATENTS

| 1,525,961 | 2/1925 | Seal | 24/73 CS |
| 2,201,394 | 5/1940 | Edelblute | 254/131 |
| 2,612,383 | 9/1952 | Manders | 24/252 R |
| 2,793,424 | 5/1957 | Witte | 254/131 |

*Primary Examiner*—Donald A. Griffin

[57] ABSTRACT

A one-man operable clamp removably secured to first one and then the other of each side door of an aircraft cargo container to unlatch such doors with facility for ready removal thereof from the container and for enabling unloading of the cargo therefrom with dispatch.

6 Claims, 8 Drawing Figures

DOOR CLAMP

It is perhaps well known that aircraft cargo containers, hereinafter termed igloos, comprise dome-shaped shells each having a closable loading and unloading space at the front thereof and each having a series of adjacent longitudinally extending channels in the bottom thereof for the reception and sliding therein of a center door and a side door on each side thereof to provide a three-panel or three-door closure for such loading and unloading space. Moreover, each igloo is formed with grooves in its end walls and arcuate portions of the top thereof for receiving the inner ends of the side doors as well as for receiving the top arcuate portion of each of the side doors which carry latching elements for latching the doors in closed positions to complementary latch members in the channels in opposite side walls of the igloo. Heretofore, the application of a pulling force by two operators has been necessary to effect the unlatching of such side doors, and the removal thereof by a single operator after the center door has been first removed. My present invention is directed to the elimination of one operator to a single operator and the elimination of the attendant cost involved heretofore for engaging in such operation of unlatching of the two side doors of such igloos; and to the completion of the entire operation with facility and dispatch.

A primary object of the invention is to provide a one-man operable door clamp for removable attachment to first one and then the other side door of an aircraft cargo container and utilizing as components thereof a lever and a flexible member capable of being lever-tautened to exert an increased pulling force to unlatch and move each side door with facility away from the end walls of the container for ready removal therefrom.

Another important object of my present invention is to provide a one-man operable door clamp of the indicated nature which is additionally characterized by its ease of installation, its strength and durability, and its usability by the unskilled equally as effectively as the skilled.

A still further object of my invention is to provide a door clamp of the aforementioned character which can be used again and again without likelihood of undue wear requiring replacement of components.

Other objects of the invention, together with some of the advantageous features thereof, will appear from the following description of the embodiment of the invention illustrated in the accompanying drawings exemplifying the best mode of construction thereof and the manner of using the same. It is to be understood that the appended claims are intended to cover the illustrated embodiment as well as modifications thereof within the scope and purview of my invention.

Referring to the drawings.

In its best mode of construction the door clamp of my present invention for unlatching a firmly latched door of an aircraft cargo igloo comprises in combination with a door stop in the floor of the igloo and a side door of the igloo, an indeterminate length lever having a pair of longitudinally spaced apart apertures therein as well as an opening adjacent to one end thereof, a pair of flexible elements looped through said apertures, a pair of pivotally connected spring-loaded links secured to each of said flexible elements, together with a flexible member looped through said opening in said lever, and means for securing the ends of said flexible member to said door stop; forceful movement of said lever by a single operator in one direction with said pairs of links engaging a side door of said igloo and with said flexible member engaging said door stop casuing tautening of said pair of flexible elements and of said flexible member and the transmission of a substantial pulling force on said side door to unlatch the same.

Figure 1:
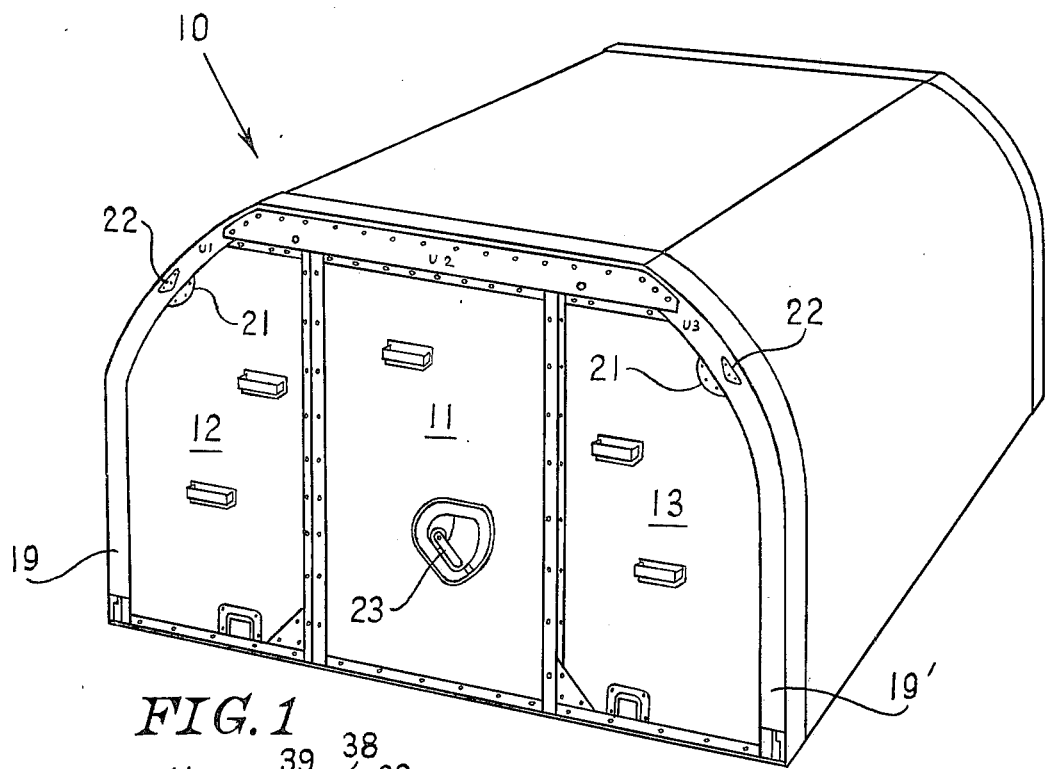
FIG. 1 is a front perspective view of a cargo igloo in which my door clamp is installed and operated, this view showing the front closure comprising a center door and a pair of side doors.
Figure 3:
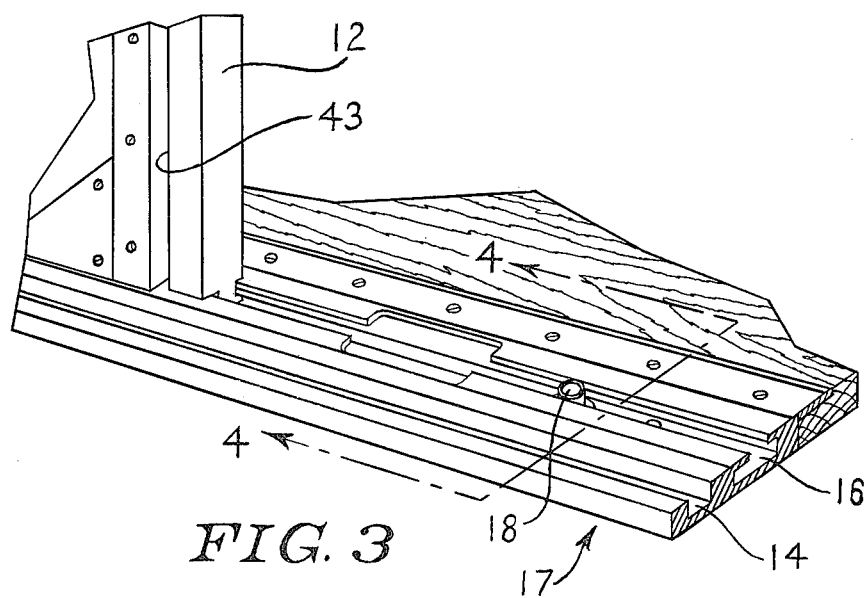
FIG. 3 is a fragmentary plan view of the bottom of the cargo igloo showing the adjacently positioned grooves therein.
Figure 4:
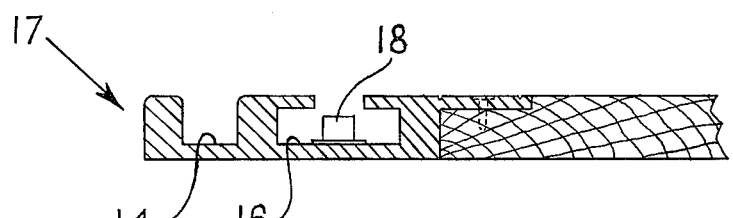
FIG. 4 is a sectional elevational view of a portion of the bottom of the igloo, this view being taken on the line 4—4 of FIG. 3.

In FIG. 1 of the annexed drawings, I have illustrated a conventional aircraft cargo igloo which is generally designated by the reference numeral 10 and which is of general dome shape having a relatively wide front space closed by removable doors consisting of a center door 11, a left side door 12 and a right side door 13 which are slidably mounted in grooves 14 and 16, see FIGS. 3 and 4, fashioned in the bottom of the floor assembly 17, and stops 18 are provided in the grooves against which the doors abut. The igloo 10 per se is not claimed by me as my invention but the stops 18 in grooves 14 and 16 are a component of the door clamp hereinafter described and claimed. It is also to be observed that the opposite end walls 19 and 19' of igloo 10 are channelled or grooved, not shown, for receiving the inner ends of side doors 12 and 13; such inner ends being provided with a female latching element 21 which receives a male latching element 22 secured within the channels of the end walls 19 and 19' of igloo, as indicated by the dotted line showing of FIG. 1. Suitable lifting handles are permanently attached to the outside of the igloo doors 11, 12 and 13 and a turnable latch 23 cooperating with an inner latch, not shown, is provided on center door 11 of the igloo for latching the same in closed position, and for unlatching the same preparatory to removing such center door from the main frame of the igloo.

In accordance with my present invention for speedily unlatching the side doors 12 and 13 from their firmly latched positions, preparatory to removing the same, I provide an improved door clamp which is generally designated by the reference numeral 25 in the annexed drawings and which comprises a manually movable lever 26 of indeterminate length and having a pair of spaced apart apertures 27 and 28 formed therein as well as fashioned with an opening 29 adjacent to one end thereof. The lever 26 can be constructed of steel of round or angular cross-section or can be made from a relatively hard wood, or can be molded from a suitable plastic material such as a urea or phenol condensate with the formed apertures 27 and 28 and hole 29 therein.

Figure 2:
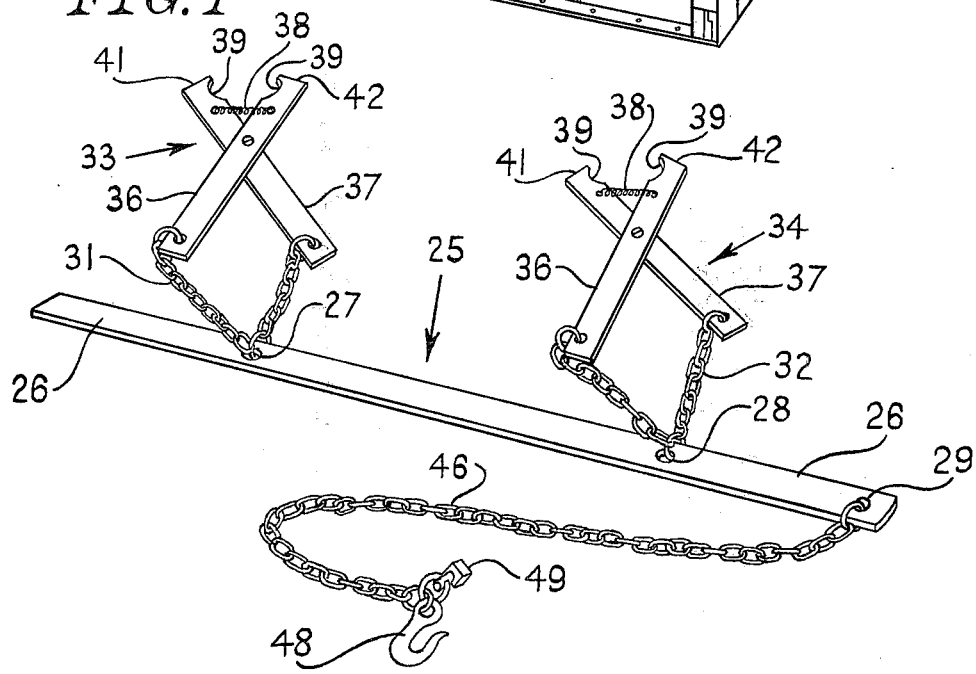
FIG. 2 is a perspective view of the door clamp of my present invention.

Looped through each of the apertures so as to extend from one side of lever 26 are flexible elements 31 and 32, which conveniently can be link chains, to the outer ends of each are attached a pair of what may be termed lazy-tongs generally designated by the reference numerals 33 and 34, respectively, each consisting of pivotally connected spring-loaded links 36 and 37 including a compression spring 38 normally biasing the outer ends of such links 33 and 34 toward one another. As shown, each of the links 37 and 38 of each of the lazy-tongs is formed with a recess 39 therein so as to provide opposed jaws 41 and 42 at the outer ends of the links which enter opposite sides of a channel 43 fashioned in the side doors 12 and 13 of the igloo, see FIG. 3, to retain each of the lazy-tongs 33 and 34 on the outer end of each side door of the igloo, in spaced relationship vertically, as a first step in setting up my improved door clamp in operative positions. A flexible member 46 is another component of my improved door clamp, and such flexible member is looped through the opening or hole 29 to extend from the opposite side of lever 26, as clearly shown in FIG. 2 of the annexed drawings. Instead of looping the flexible member 46 through hole 29 of the lever, an enlarged split-ring 47 can be secured to the inner end of the flexible member and used to secure the member 46 to the lever 26. As indicated, I preferably utilize a link chain as flexible member 46, and I secure to the outer end thereof, a hook 48 for attaching the chain to a door stop 18 in the bottom of the door assembly 17 of the igloo. An extra pin 49 can be secured or inserted in a hole formed in the floor of the igloo adjacent to hook 48 on flexible member 46 for use in the event that there is no stop 18 or pin available in the groove 16 of the igloo floor.

Figure 6:
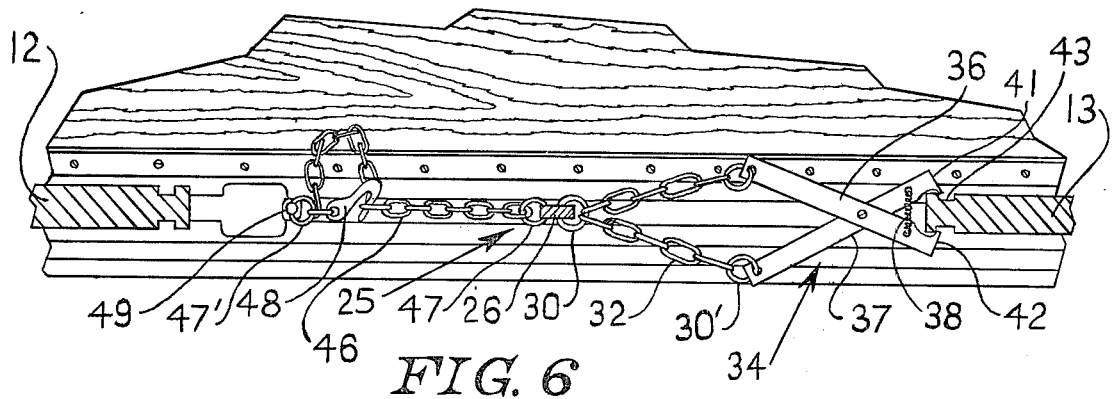
FIG. 6 is a fragmentary plan view of the bottom of a cargo igloo with a plan view of an embodiment of the invention installed in operative position clamping the right front door shown in fragmentary section, this view being taken on the line 6—6 of FIG. 5.

As indicated in FIG. 6 of the annexed drawings, instead of employing single flexible elements 31 and 32 looped through the apertures 27 and 28 in lever 26, a split-ring 30 can be used to secure the flexible elements, such as chains 31 and 32, to the lever 26, as desired. Also split-rings 30' can be secured to the outer links of the chains 31 and 32 for securing the chains to the links 36 and 37 of the lazy-tongs 33 and 34. An enlarged split-ring 47' to which the hook 48 is attached, can be used to fasten the flexible number 46 to the stop 49.

Figure 5:
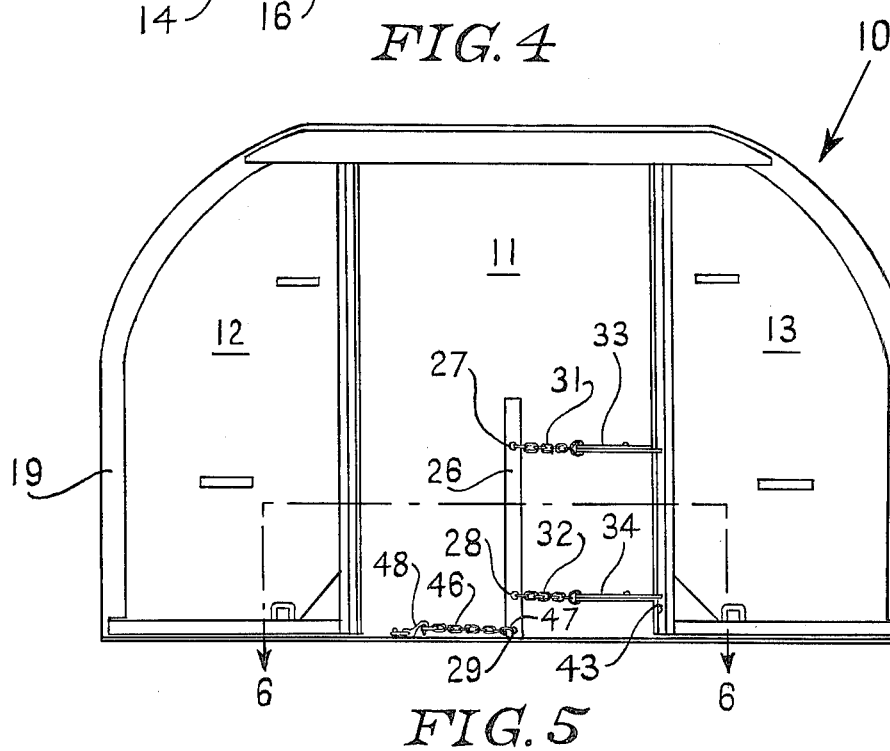
FIG. 5 is an elevational view of a cargo igloo with an embodiment of my invention installed in stabilized condition for grasping the lever component prior to removal of one flexible element to permit forcible movement of the lever component for unlatching the right side door.
Figure 7:
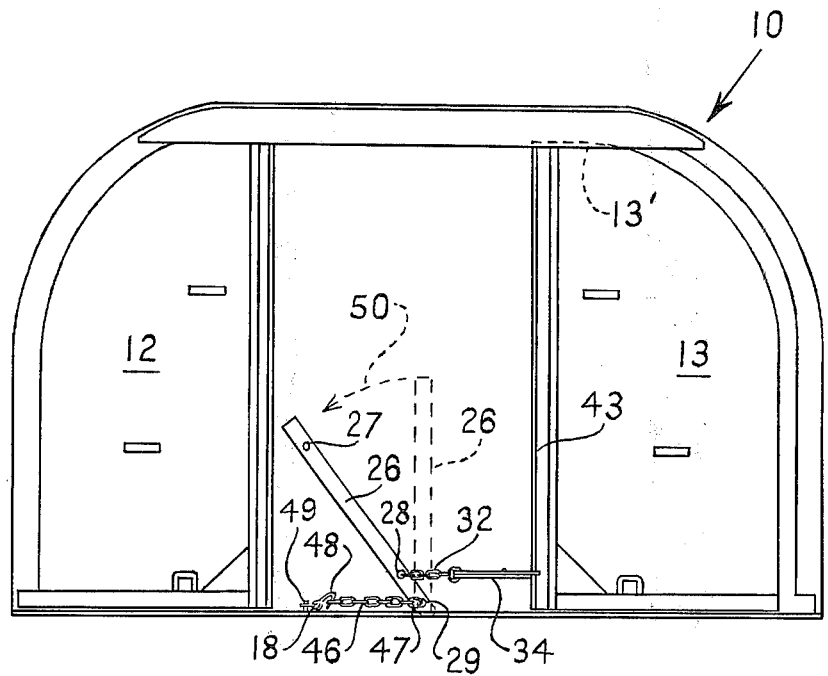
FIG. 7 is an elevational view similar to FIG. 5 but with the upper flexible element removed and with the right side door unlatched and partially moved away from the inner end wall of the igloo, the dotted line with dotted arrow indicating the extent of forcible movement of the lever component of my invention to effect the unlatching of such side door.

With the lazy-tongs 33 and 34 secured to the outer end of the right hand door 13, as clearly illustrated in FIG. 5, the door clamp 25 may be readily stabilized with the lever 26 set up in a vertical position and with the flexible member 46 fastened to a stop in the floor of the igloo 10. In order to place the door clamp of my invention in operative position for the application of a steady manual force to the lever 26 thereof, the top lazy-tong 33 is first removed from the outer end of the side door 13 and either is allowed to hang with the flexible element 32 from the lever, or is entirely removed from the lever 26, as clearly shown in FIG. 7. The single operator then applies manual force to the lever 26 adjacent to the top thereof and moves such lever in the direction of arrow 50 with the bottom of the lever engaging the floor of the igloo as a fulcrum. That is to say, with reference to FIG. 7, the lever 26 is moved from the dotted line position to the full line position in this view. This action will tauten not only the chain 46 but also the lazy-tong 34 including flexible element 32. The application of additional manual force to lever 26 will break the latch at the inner end of door 13 by pulling apart the latching components 21 and 22, see FIG. 1, and thus open such door slightly, as indicated by the spaced apart relation between the inner end of door 13 and the side wall 19' of the igloo, see FIG. 7, as well as the dotted line showing 13' at the arcuate top of the door 13.

Figure 8:
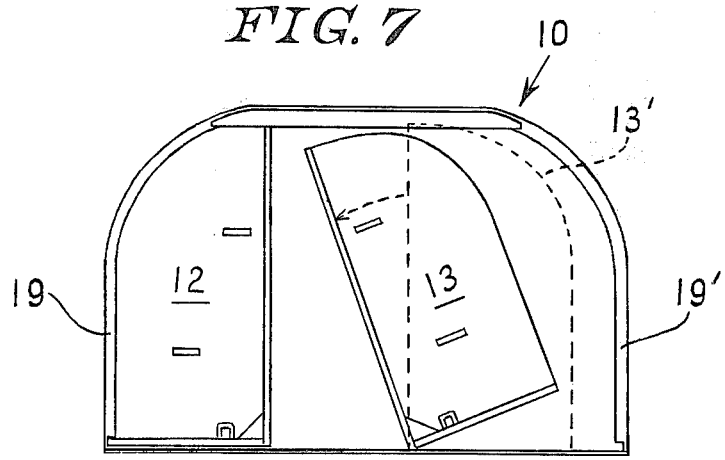
FIG. 8 is a reduced elevational view of the igloo with the lower outer side of the right side door of the igloo engaging a stop member and the door tilted to enable grasping both sides of such door for lifting and removing the door from the igloo.

As illustrated in FIG. 8, it is a relatively simple task for the single operator to grasp the unlatched door 13 in his hands and tilt it against a floor door stop after sliding it away from end wall 19' of the igloo, and thereafter lift the unlatched door out of its groove 16 followed by removal of the door from the igloo. This unlatching of side door 13 and removal thereof from the cargo igloo can be accomplished in a matter of seconds, and the complete setting up of my improved door clamp and the operative movements thereof can be accomplished by a single operator in less than five minutes.

The same steps and procedures can be followed with respect to clamping the door clamp 25 in a set up position to the other or left side door 12 of the igloo; the tautening of the flexible elements and flexible member, removal of the top flexible element from the lever, and the application of manual force to the lever 26 to unlatch the latching elements 21 and 22 at the end wall 19 of the igloo, followed by grasping and lifting such left side door 12 from its position in the igloo, permitting thereby the ready removal of the contents of the igloo through the space thus provided.

Inasmuch as the operation of removing both side doors 12 and 13 after first removing center door, 11, can be accomplished with the use of my improved door clamp 25 by the work of a single operator within a matter of less than ten minutes, it is clear that I have provided a unique and advantageous device which fits in admirably with automatic operations presently being carried on for unloading cargo igloos from aircraft by fork lifts and conveyors which remove the igloos from the aircraft and convey them to an adjacent warehouse. Upon removal of the doors 11, 12 and 13 of the igloo and placing them in a nearby rack, the cargo is conveniently removed by the automatically operated fork and the igloo is thus quickly ready for receiving new cargo, the doors promptly replaced and the igloo raised upon a conveyor for movement into the waiting aircraft or other cargo plane.

Variations in the components of the embodiment illustrated within the scope and purview of the invention are intended to be covered by the appended claims.

I claim:

1. A one-man operable door clamp for unlatching a firmly latched side door of an aircraft igloo requiring the application of a substantial external force to open; said door clamp comprising, in combination with a stop pin in the floor of the igloo and a firmly latched side door thereof, a lever having at least one aperture therein as well as having a hole therein adjacent to one end thereof, at least one flexible element looped through said aperture with ends thereof projecting to one side of said lever, a pair of pivotally connected spring-loaded links secured to said ends of said flexible element; said links defining opposed gripping jaws at their outer extremities for firmly grasping opposite sides of the outer end of said latched side door of said igloo, a flexible member engaged in said hole of said lever and projecting to the other side thereof, and a hook on said flexible member detachably engageable with said stop pin; movement of said lever by the application of a steady substantial external force in a direction away from said side door with said opposed jaws of said pivotally connected spring-loaded links gripping opposite sides of the outer end of side door and with said hook engaged with said stop pin effecting a tautening of said flexible element and said flexible member and an unlatching of said side door to open the same for ready removal of said side door from the igloo.

2. A door clamp as set forth in claim 1 wherein said links have opposed arcuate recesses therein adjacent to their outer extremities to define said pair of opposed gripping jaws.

3. A door clamp as set forth in claim 1, and a stop pin on said flexible member adjacent to said hook.

4. A door clamp as set forth in claim 1 wherein a split-ring is attached to said flexible member and looped through said hole for securing said flexible member to said lever.

5. A door clamp as set forth in claim 1 wherein a split-ring is attached to said flexible element and looped through said aperture for securing said flexible element to said lever.

6. A one-man operable door clamp comprising, in combination with a stop pin in the floor of the igloo and a firmly latched side door thereof, a lever having at least two apertures therein arranged in spaced relation to one another, a flexible element looped through each of said apertures and a pair of pivotally connected spring-loaded links secured to said flexible elements so that the outer end of said side door is engageable in spaced apart relationship by a pair of opposed jaws on each of said pair of pivotally connected links.

* * * * *